US007268901B2

(12) United States Patent
Brewster et al.

(10) Patent No.: US 7,268,901 B2
(45) Date of Patent: Sep. 11, 2007

(54) INTELLIGENT PRINTING BY A KIOSK

(75) Inventors: Jon A. Brewster, Monmouth, OR (US); Kenneth H. Bronstein, Corvallis, OR (US); Robert M. Miller, Corvallis, OR (US); Kenneth Oar, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 868 days.

(21) Appl. No.: 09/916,894

(22) Filed: Jul. 26, 2001

(65) Prior Publication Data

US 2003/0020947 A1 Jan. 30, 2003

(51) Int. Cl.
*G06F 3/12* (2006.01)
*G06K 15/00* (2006.01)

(52) U.S. Cl. .................................... 358/1.15; 358/1.18

(58) Field of Classification Search ............... 358/1.15, 358/1.9, 3.28, 1.16, 1.18, 471, 571, 1.1, 1.5, 358/1.6, 1.13, 468; 707/100, 102, 104.1; 705/16, 23

See application file for complete search history.

(56) References Cited

U.S. PATENT DOCUMENTS

| | | | | |
|---|---|---|---|---|
| 5,305,197 | A * | 4/1994 | Axler et al. | 705/14 |
| 5,630,103 | A * | 5/1997 | Smith et al. | 703/6 |
| 5,689,648 | A * | 11/1997 | Diaz et al. | 705/26 |
| 5,761,662 | A | 6/1998 | Dasan | 707/10 |
| 5,845,577 | A * | 12/1998 | Nelson et al. | 101/494 |
| 5,860,362 | A * | 1/1999 | Smith | 101/494 |
| 5,884,140 | A * | 3/1999 | Ishizaki et al. | 455/2.01 |
| 6,209,090 | B1 * | 3/2001 | Aisenberg et al. | 713/178 |
| 6,322,262 | B1 * | 11/2001 | Trosterud | 400/70 |
| 6,535,791 | B1 * | 3/2003 | Wang | 700/235 |
| 6,591,068 | B1 * | 7/2003 | Dietz | 396/429 |
| 2002/0078171 | A1 * | 6/2002 | Schneider | 709/218 |

OTHER PUBLICATIONS

David C. Husman, "A UHF Movement Detector"; RF Design; pp. 41 & 43.

* cited by examiner

*Primary Examiner*—Dov Popovici

(57) ABSTRACT

A publication is distributed by an automated publication delivery system. Activity around a physical location of the automated publication delivery system is monitored. In response to detection of an increased activity level around the physical location of the automated publication delivery system, additional copies of the publication are printed for distribution. For example, the automated publication delivery system is a kiosk and the publication is a newspaper. Monitoring is performed, for example, using a microphone to monitor noise level, an optical sensor to detect movement near the automated publication delivery system, and/or a motion detector to detect movement near the automated publication delivery system.

22 Claims, 5 Drawing Sheets

INTELLIGENT PRINTING BY A KIOSK

BACKGROUND

The present invention pertains to delivery of information in printed form and pertains particularly to intelligent printing by a kiosk.

Travelers and others want to stay informed about what is happening in the world. Often airport newsstands only have the early morning edition of the local and national newspapers, nothing more current. When traveling, and passing through an airport, there is usually no time to wait for a paper or document to be printed out. As stated by certain marketing researchers: "People won't wait for money to be printed".

It is desirable therefore to arrange for ways to make available to travelers fast delivery of current news in printed form.

SUMMARY OF THE INVENTION

A publication is distributed by a publication delivery system. Activity around a physical location of the automated publication delivery system is monitored. The timing and number of the publication printed is based upon response to detection of an activity level around the physical location of the publication delivery system.

DESCRIPTION OF THE PREFERRED EMBODIMENT

Figure 1:
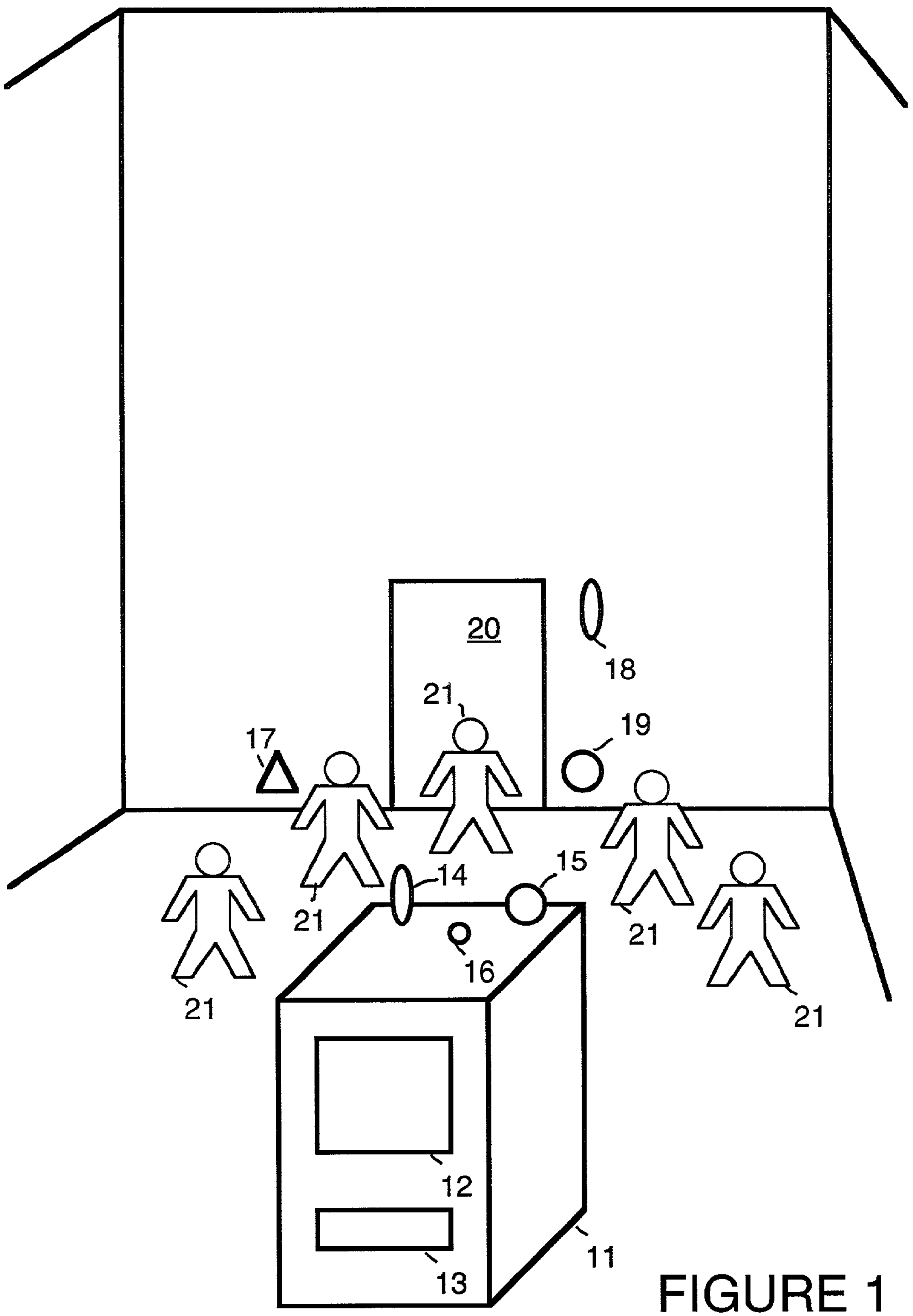
FIG. 1 is a simplified diagram that shows a kiosk with intelligent printing features located in a public place in accordance with a preferred embodiment of the present invention.

FIG. 1 shows a kiosk 11 with intelligent printing features located in a public place. For example, kiosk 11 is a vending machine that prints newspapers for individuals. Kiosk 11 includes user controls 12 and a newspaper delivery area 13 through which is delivered a newspaper.

Kiosk 11 has the ability to print newspapers while a customer waits. However, many customers may not want to wait for a newspaper. Therefore, kiosk 11 includes one or more response mechanisms that monitor activity around or near kiosk 11. For example, a microphone 14 sits on top of kiosk 11 to monitor noise level. In addition, or alternatively, an optical sensor 15 is placed on or around kiosk 11. Microphone 14 and/or optical sensor 15 detect when potential customers are in the vicinity of kiosk 11 and prints in advance one or more copies of the newspaper so that a current copy will be available to any customer.

Kiosk 11 also includes, for example, a receiver 16 that receives information from remote detectors. For example, an optical sensor 19, a microphone 18 and/or a motion detector 17 are placed near an entry way 20 in order to detect new potential customers entering an area in which kiosk 11 resides. Additionally, a human monitor can be used to signal kiosk 11 to print new papers.

Thus kiosk 11 receives external inputs from sensory devices that inform kiosk 11 when there is sufficient activity to warrant printing additional newspapers. For example, within an airport, the external inputs indicate a level of activity consistent with a flight arrival, or the gathering of passengers waiting to embark on a flight.

In addition, kiosk 11 can also print copies based on other indicators. For example, an airline flight schedule can be used to project expected activity around a kiosk in an airport. For example, departing flights with "Delayed" might indicate to kiosk 11 that more people may need a paper, resulting in kiosk 11 printing additional papers.

If in a hotel lobby, kiosk 11 can use an airport shuttle arrival as an indication of increased activity. Also, kiosk 11 can print newspapers in accordance with a schedule of when potential customers are likely to be in the vicinity. For example a 6 AM printing can occur so that individuals going to a dining area to eat a continental buffet style breakfast would have sufficient papers. From any or all of these types of inputs indicating an increase of activity in the vicinity of kiosk 11, kiosk 11 determines how many publications to print. A single human can be used to monitor an entire "bank" of kiosks, to determine if the criteria used to print newspapers is effective.

Figure 2:
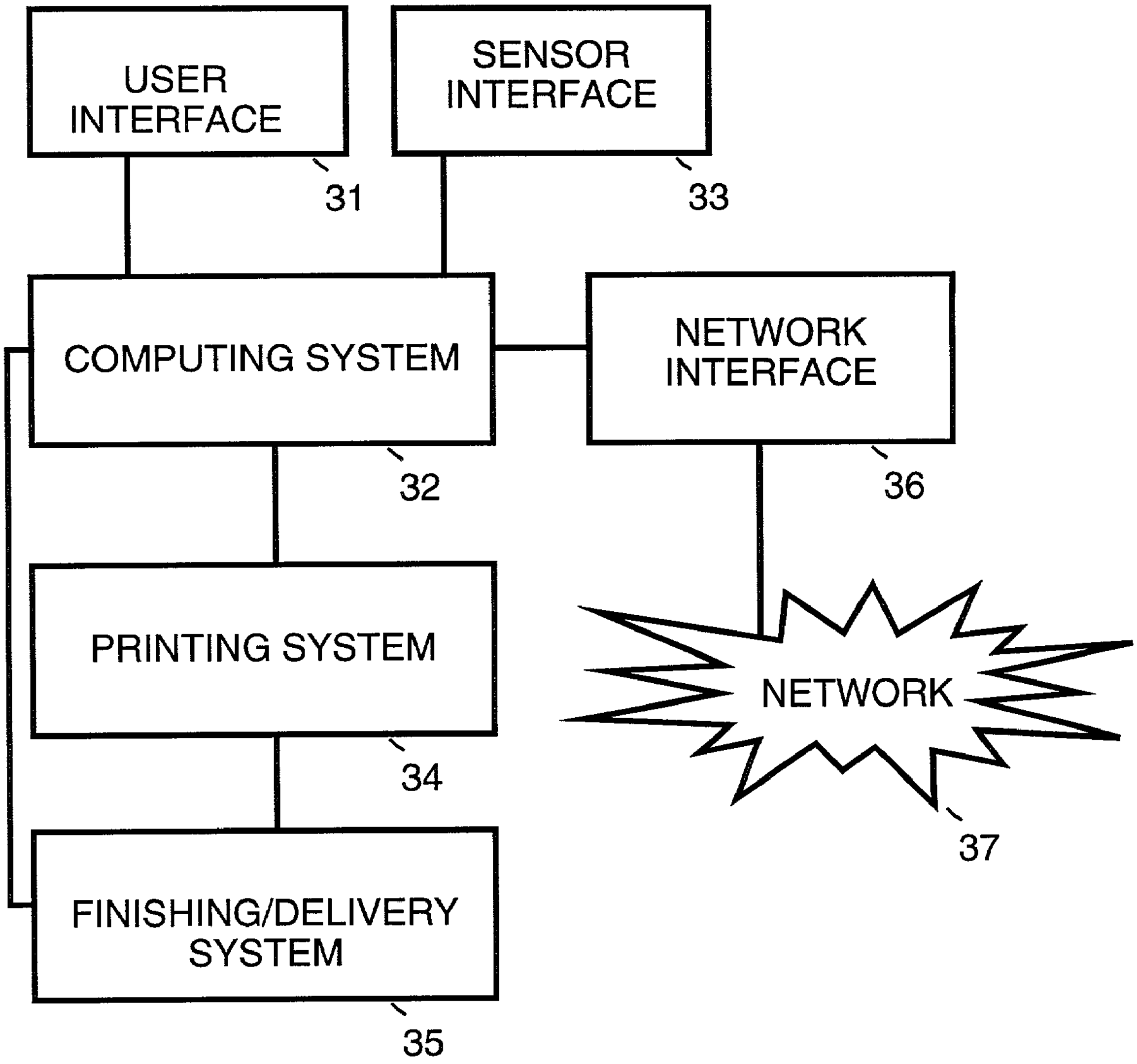
FIG. 2 is a simplified functional block diagram of the kiosk in accordance with a preferred embodiment of the present invention.

FIG. 2 is a simplified functional block diagram of kiosk 11. A computing system 11 interacts with user controls 12 via a user interface 31. Computing system 32 interacts with microphone 14, optical sensor 15 and receiver 16 via a sensor interface 33. Computer system 32 also controls a printing system 34 and a finishing/delivery system 35. Finishing/delivery system 35 is responsible for folding and/or stapling a printed newspaper. Finishing/delivery system 35 also stores printed newspapers until requested by computing system 32 to deliver a finished newspaper to newspaper delivery area 13.

Computing system 32 uses a network interface 36 to obtain current newspaper print data from a network 37. For example, network 37 provides connection to an information service such as http://www.instant-delivery.com/.

Since kiosk 11 prints some newspapers in advance, it is desirable for kiosk 11 to monitor the newspapers to make sure that a customer is receiving current news. This can be done, for example, by computing system 32 tracking each paper printed and sold.

Figure 3:
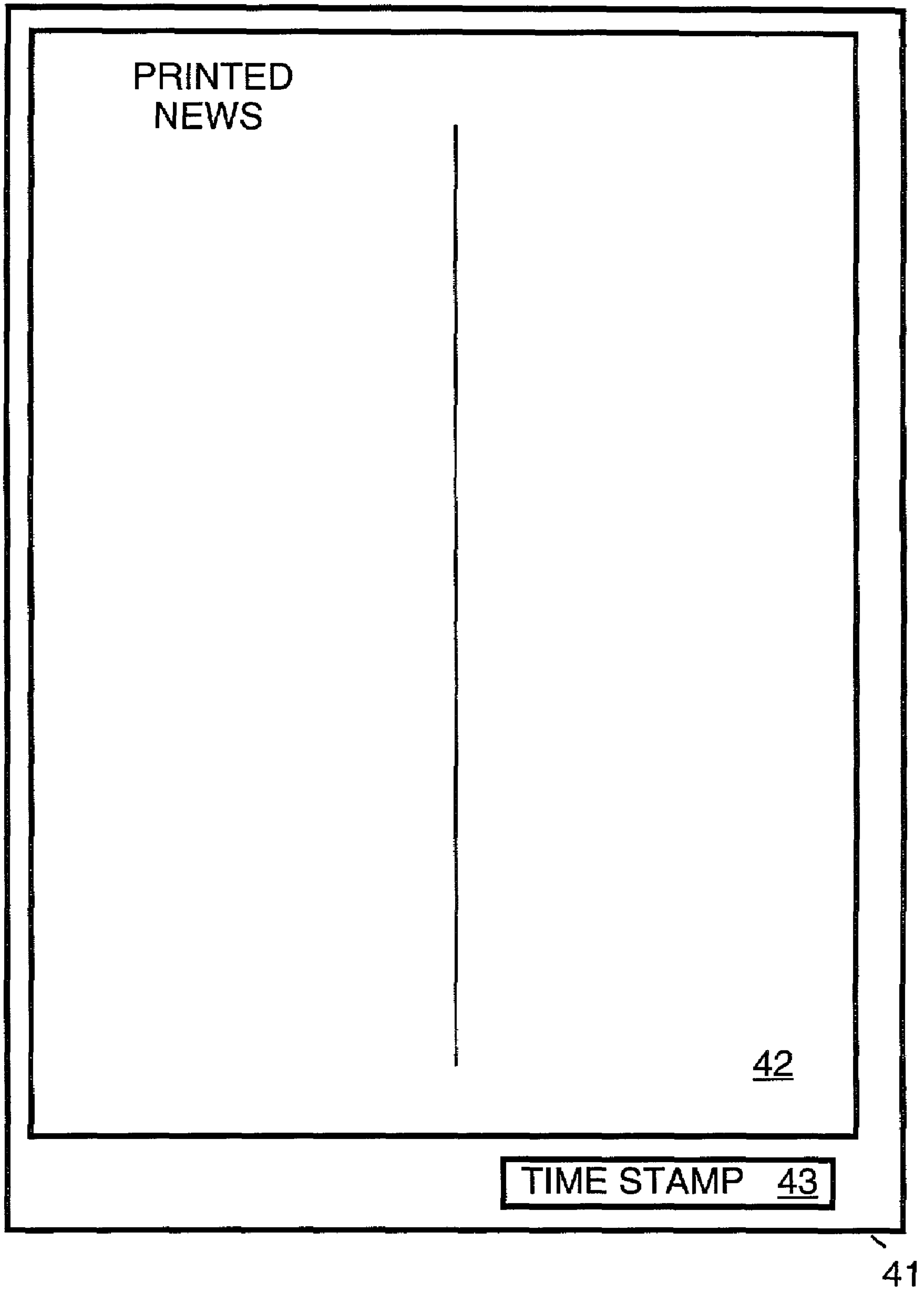
FIG. 3 illustrates a time stamp being placed on a first sheet of a printed newspaper in accordance with a preferred embodiment of the present invention.

In the preferred embodiment of the present invention, each printed newspaper is printed with a time stamp. This is illustrated in FIG. 3 where the first page of a printed newspaper 41, in addition to news 42, includes a time stamp 43. For example, time stamp 43 is a barcode that indicates a time of printing.

Figure 4:
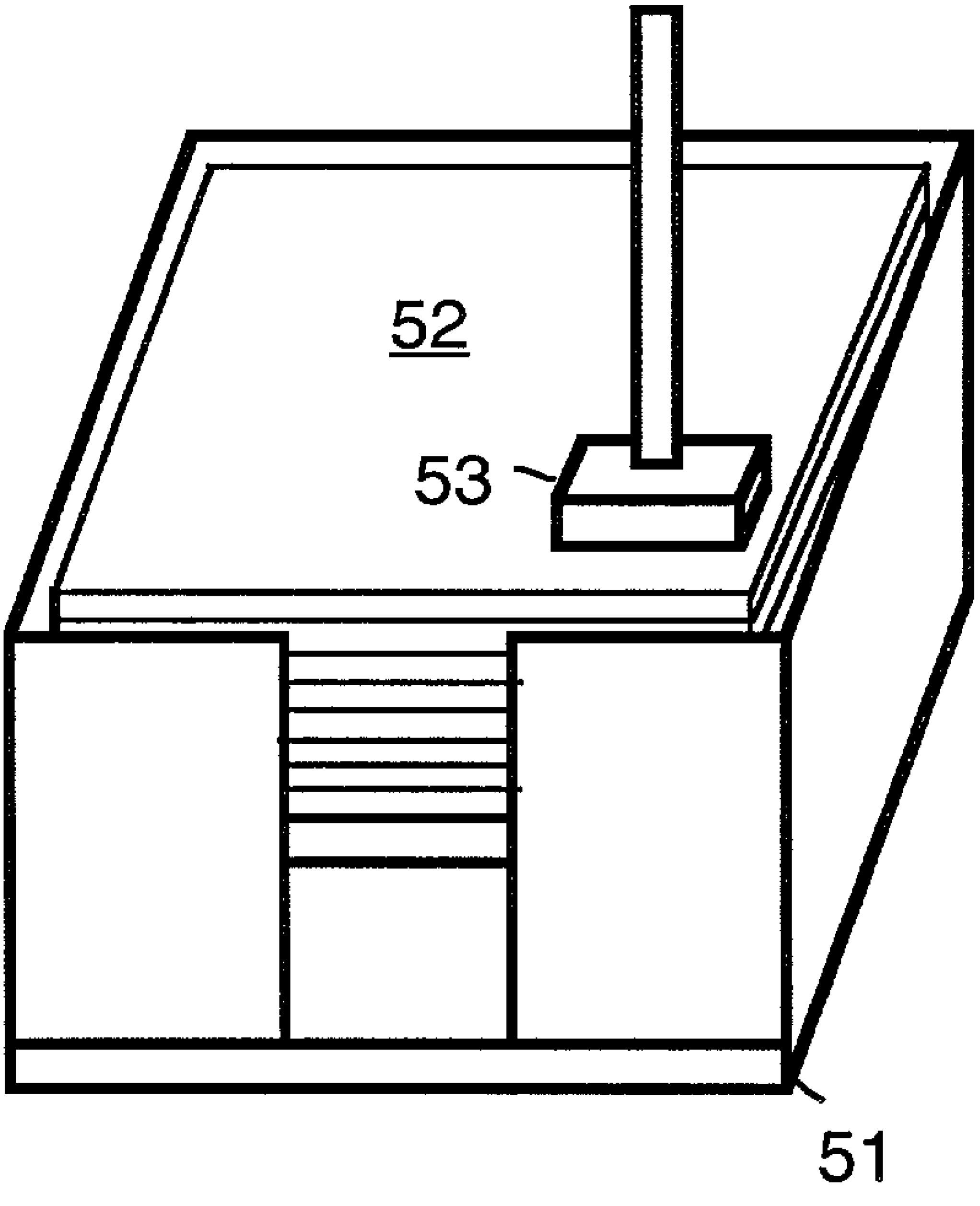
FIG. 4 illustrates a reader used to read a time stamp on a top sheet of a storage bin of kiosk in accordance with a preferred embodiment of the present invention.

FIG. 4 shows a storage area 51 within kiosk 11, used to store printed newspapers. The most recent newspapers are placed front-up on the top of the stack. Thus a newspaper 52 on the top of the stack has the most recent news. A time stamp reader 53 is used to read the date on top of the stack newspaper 52. For example, time stamp reader 53 is a bar code reader.

Time stamp reader 53 assures that newspapers sold include "fresh" content. When news is no longer fresh, additional copies can be printed for potential customers.

Dispensing of the current news comes from the top most portion of the stack. When the most recent copies have been exhausted, Kiosk 11 displays a message on a display within user controls 12 (shown in FIG. 1) informing a potential customer of how long since the news was printed and gives the customer that the option of receiving a copy immediately or waiting while a newer version is printed.

Figure 5:
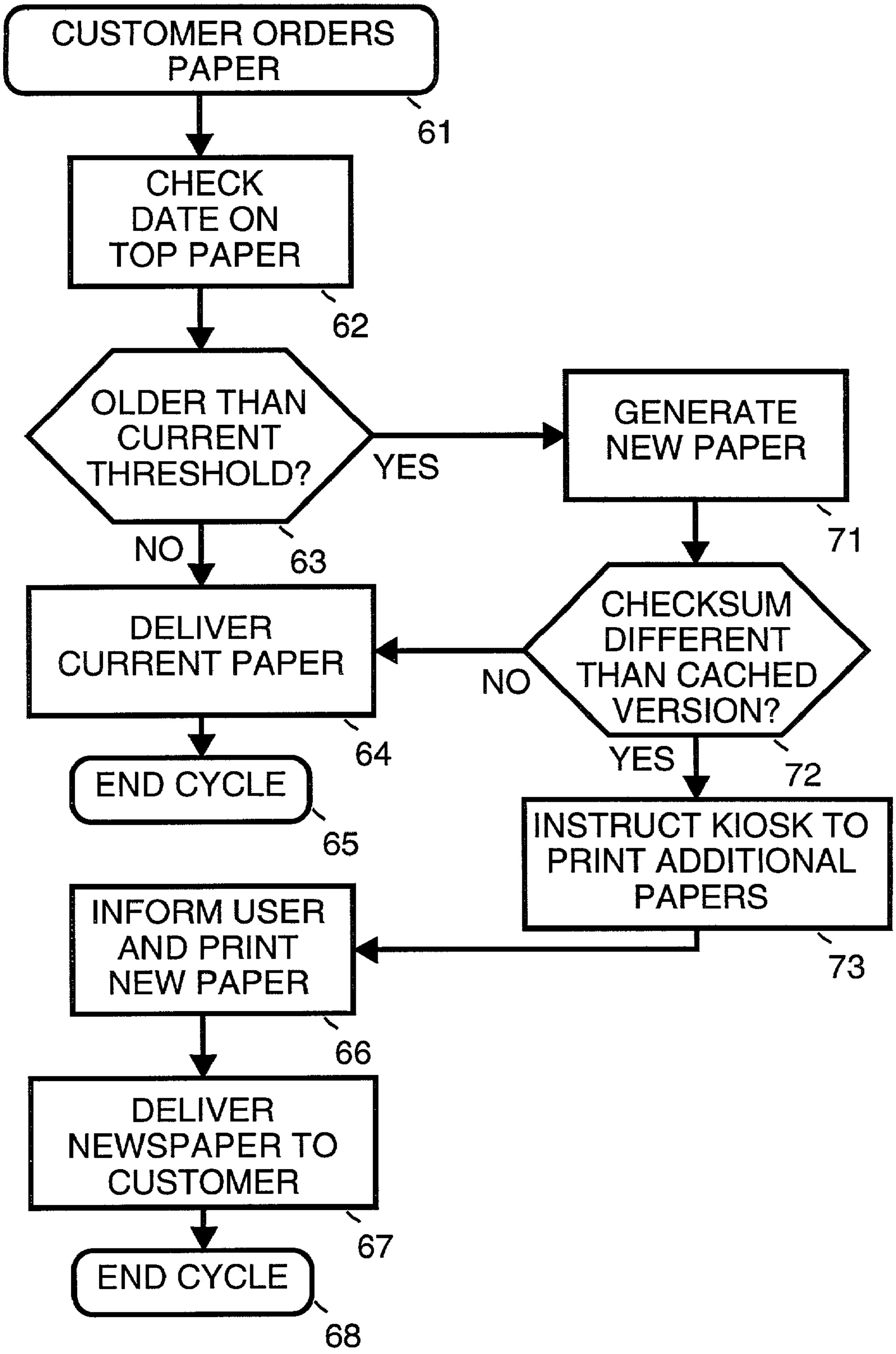
FIG. 5 is a simplified flowchart that illustrates use of a time stamp to assure that a purchaser gets a newspaper that is up-to-the minute current in accordance with a preferred embodiment of the present invention.

FIG. 5 is a simplified flowchart that illustrates how kiosk 11 uses the time stamp to assure a customer gets a current newspaper. In a step 61, a user orders a newspaper. In a step 62, kiosk 11 uses time stamp reader 53 to determine a time the newspaper on the top of the stack was printed. If in a step 63, the time is not older than a current threshold, in a step 64, the current newspaper is delivered and in a step 65 the cycle is ended. The current threshold varies depending on the publication and market. For example, for an airport, the threshold might be as long as 5 hours or as short as 10 minutes, depending upon time of day, day of the week and/or other factors.

If in step 63, the time stamp indicates a publication time older than the current threshold, kiosk 11 sends a message through network 37 (shown in FIG. 1), to the electronic publisher (source) of the newspaper, for example, http://www.instant-delivery.com/. The publisher, in a step 71 generates a new version of the newspaper. In a step 72, the publisher compares a checksum of the newly generated newspaper with the checksum of a current cached version of the newspaper on the top of stack newspapers within kiosk 11. If the checksums are equal, the publisher instructs kiosk 11 to deliver the current version of the newspaper to the customer (as shown in step 64). For example, kiosk 11 calculates the checksum of a current cached version of the newspaper. Kiosk 11 sends the checksum to the publisher as part of the message sent through network 37 to the newspaper publisher.

If in step 72 the checksums are not equal, in a step 73, the publisher downloads the current version of the newspaper to kiosk 11 and instructs kiosk 11 to print (an) additional newspaper(s). In a step 66, kiosk 11 prints a current version of the newspaper for the customer. Kiosk 11 also gives the customer the option of waiting while the newer version is printed, or of immediately receiving the "stale" newspaper already printed.

In a step 67 the selected newspaper is delivered to the customer. In a step 68, the cycle is completed.

Thus, the present invention provides for fast automated delivery of current news and information to a hurried customer.

What is claimed is:

1. A publication delivery system comprising:

a printing mechanism for printing copies of a publication before copies are requested by potential customers so that after a copy of the printed publication is requested by a customer, the customer can receive the copy of the printed publication without having to wait for the printing mechanism to print the copy of the publication; and a response system that monitors activity level around a physical location of the publication delivery system in order to detect proximity of potential customers, wherein timing and number of copies of the publication printed by the printing mechanism are based on the activity level detected by the response system, wherein an increased detected activity level results in an increased number of copies of the publication being printed.

2. A publication delivery system as in claim 1 wherein the publication delivery system is a kiosk and the publication is a newspaper.

3. A publication delivery system as in claim 1 wherein the response system includes a microphone that is used to monitor noise level.

4. A publication delivery system as in claim 1 wherein the response system includes an optical sensor to detect movement near the publication delivery system.

5. A publication delivery system as in claim 1 wherein the response system includes a motion detector used to detect movement near the publication delivery system.

6. A publication delivery system as in claim 1 additionally comprising:

network access, the print delivery system using the network access to update content of the publication.

7. A publication delivery system as in claim 1 additionally comprising:

a storage area that stores printed copies of the publication; and, a time stamp reader for reading a time stamp on a most recently printed copy of the publication stored in the storage area, wherein the print delivery system uses the time stamp to determine freshness of the most recently printed copy of the publication stored in the storage area.

8. A publication delivery system as in claim 7 wherein the time stamp is a bar code and the time stamp reader is a bar code reader.

9. A method for distributing a publication by an automated kiosk, comprising the following:

(a) in response to a customer ordering a publication, performing the following by the kiosk:

(a.1) checking a time stamp on a most recently printed publication stored in a storage area, the storage area being used to store already printed copies of the publication so that after the publication is ordered by the customer, the customer can receive a printed copy of the publication without having to wait for a printing mechanism to print the copy of the publication, (a.2) determining whether a fresher version of the printed publication is electronically available, (a.3) when in (a.2) it is determined that a fresher version of the printed publication is not electronically available, delivering to the customer the most recently printed publication stored in the storage area, and (a.4) when in (a.2) it is determined that a fresher version of the printed publication is electronically available and the customer indicates a willingness to wait for printing, obtaining the fresher version of the printed publication, and printing out the fresher version of the publication for delivery to the customer.

10. A method as in claim 9 wherein (a.2) comprises the following:

contacting, by the kiosk, an electronic publisher of the publication, wherein the electronic publisher performs the following:

comparing a checksum for a most recently generated version of the publication with a checksum for the most recently printed publication stored in the storage area, and indicating to the kiosk the results of the comparison.

11. A method as in claim 9 wherein the time stamp is a bar code and (a.1) is performed with use of a bar code reader.

12. A method for distributing a publication by an automated publication delivery system, comprising the following:

(a) monitoring activity around a physical location of the automated publication delivery system in order to detect proximity of potential customers; and, (b) in response to detection of an increased activity level around the physical location of the automated publication delivery system, printing additional copies of the publication for distribution so that copies are already printed before being ordered by customers so that after a copy of the printed publication is ordered by a customer, the customer can receive the copy of the printed publication without having to wait for the printing mechanism to print the copy of the publication.

13. A method as in claim 12 wherein the automated publication delivery system is a kiosk and the publication is a newspaper.

14. A method as in claim 12 wherein in (a) monitoring is performed using a microphone to monitor noise level.

15. A method as in claim 12 wherein in (a) monitoring is performed using an optical sensor to detect movement near the automated publication delivery system.

16. A method as in claim 12 wherein in (a) monitoring is performed using a motion detector to detect movement near the automated publication delivery system.

17. A method as in claim 12, additionally comprising the following:

(c) in response to a customer requesting the publication, performing the following:

(c.1) checking a time stamp on a most recently printed publication stored in a storage area, (c.2) determining whether a fresher version of the printed publication is electronically available, (c.3) when in (c.2) it is determined that a fresher version of the printed publication is not electronically available, delivering to the customer the most recently printed publication stored in the storage area, and (c.4) when in (c.2) it is determined that a fresher version of the printed publication is electronically available, obtaining the fresher version of the printed publication, and printing out the fresher version of the publication for delivery to the customer.

18. A method as in claim 12 wherein (c.2) comprises the following:

contacting, by the automated publication delivery system, an electronic publisher of the publication, wherein the electronic publisher performs the following substeps:

comparing a checksum for a most recently generated version of the publication with a checksum for the most recently printed publication stored in the storage area, and indicating to the automated publication delivery system the results of the comparison.

19. A method as in claim 17 wherein the time stamp is a bar code and (c.1) is performed with use of a bar code reader.

20. A method as in claim 12 additionally comprising the following:

(c) using network access by the automated print delivery system to update content of the publication.

21. A publication delivery system comprising:

a printing mechanism for printing a publication;

a response system that monitors activity around a physical location of the publication delivery system, wherein timing and number of printed publications printed by the printing mechanism are based on the activity detected by the response system;

a storage area that stores printed publications, the storage area being used to store already printed copies of the printed publication so that after a printed copy of the printed publication is requested by a customer, the customer can receive an already printed copy of the printed publication without having to wait for the printing mechanism to print the already printed copy of the publication; and, a time stamp reader for reading a time stamp on a most recently printed publication stored in the storage area, wherein the print delivery system uses the time stamp to determine freshness of the most recently printed publication stored in the storage area;

wherein in response to the customer requesting the publication, the time stamp reader checks a time stamp on a most recently printed publication stored in a storage area to determine whether a fresher version of the printed publication is electronically available and when a fresher version of the printed publication is electronically available, obtains the fresher version of the printed publication, and prints the fresher version out on the printing mechanism for delivery to the customer.

22. A publication delivery system as in claim 21 wherein the customer is given an option to wait for printing out of the fresher version of the publication or to immediately receive an already printed copy of the publication.

* * * * *